(12) United States Patent
Asaka et al.

(10) Patent No.: US 7,222,167 B2
(45) Date of Patent: May 22, 2007

(54) METHOD FOR MANAGING COMPUTER SYSTEM, COMPUTER EXECUTING MANAGEMENT PROGRAM, STORAGE DEVICE, DISPLAYING DEVICE, AND STORAGE SYSTEM

(75) Inventors: Yoshihiro Asaka, Kanagawa (JP); Hidetoshi Sakaki, Kanagawa (JP); Noboru Furuumi, Tokyo (JP); Masami Maeda, Kanagawa (JP); Masaru Tsukada, Kanagawa (JP); Junichi Muto, Kanagawa (JP); Misako Tamura, Shizuoka (JP)

(73) Assignee: Hitachi, Ltd., Tokyo (JP)

( * ) Notice: Subject to any disclaimer, the term of this patent is extended or adjusted under 35 U.S.C. 154(b) by 690 days.

(21) Appl. No.: 10/330,624

(22) Filed: Dec. 27, 2002

(65) Prior Publication Data

US 2003/0177217 A1  Sep. 18, 2003

(30) Foreign Application Priority Data

Dec. 28, 2001 (JP) ............................. 2001-401706

(51) Int. Cl.
*G06F 15/173* (2006.01)

(52) U.S. Cl. ..................... 709/223; 709/223; 709/249

(58) Field of Classification Search ................ 709/223, 709/249; 711/205, 207
See application file for complete search history.

(56) References Cited

U.S. PATENT DOCUMENTS 5,860,137 A  1/1999 Raz et al.

6,343,324 B1 * 1/2002 Hubis et al. ................. 709/229
6,421,711 B1 * 7/2002 Blumenau et al. ........... 709/213
2001/0054093 A1 * 12/2001 Iwatani ........................ 709/223

FOREIGN PATENT DOCUMENTS

| JP | 2001-337790 A | 12/2001 |
|----|---------------|---------|
| WO | WO 00/29954 A | 5/2000  |
| WO | WO 01/01241 A2 | 1/2001 |
| WO | WO 01/01241 A3 | 1/2001 |

OTHER PUBLICATIONS

European Patent Office Examination Report dated Sep. 22, 2006 for European patent application EP02028628.2 (Sep. 2006).

(Continued)

*Primary Examiner*—Saleh Najjar
*Assistant Examiner*—Thuong Nguyen
(74) *Attorney, Agent, or Firm*—Townsend and Townsend and Crew LLP

(57) ABSTRACT

A storage system comprising a host device, a storage device, a switching device, and a management terminal is provided. The host device has a plurality of first logical blocks. The storage device has a plurality of second logical blocks. The switching device transfers data between the host device and the storage device through a plurality of paths. The management terminal receives information on the first logical blocks from the host device, receives information on the second logical blocks from the storage device, and generates information showing connecting paths between the first logical blocks and the second logical blocks based on the information on the first logical blocks received and the information on the second logical blocks received. Accordingly, it is possible to get hold of the connected configuration of the first logical blocks and the second logical blocks.

10 Claims, 6 Drawing Sheets

OTHER PUBLICATIONS

"SAMS: Vantage Network Edition strongly supports management of storage resources in a network and integrated operation of them," NIKKEI Information Strategy, Nikkei Business Publications, Inc., (Jan. 2000).

"VERITAS SANPointControl—Realizing SAN potential with a powerful centralized management tool," HitachiData Systems and VERITAS Software (Apr. 2001).

Bayashi "The SAN has been spreading and advancing in Japan; now, what's going on around the SAN market?" INTEROP Magazine, Soft Bank Publishing Corp. pp. 176-179 (Feb. 2001).

Igarashi "Storage Management Solution in the SAN Environment," FUJITSU Journal 52: 118-122 (Mar. 2001).

Yashio et al. "Fujitsu's Storage Are Network (SAN) Technologies," FUJITSU Journal 52:113-117 (Mar. 2001).

* cited by examiner

| PATH-GROUP ID | LOGICAL BLOCK | HOST PORT |
|---|---|---|
| AAAA | LB1 | Ph1 |
| CCCC | LB1 | Ph2 |
| FFFF | LB1 | Ph3 |
| ⋮ | ⋮ | ⋮ |

| PATH-GROUP ID | LOGICAL BLOCK | HOST PORT |
|---|---|---|
| BBBB | LB2 | Ph3 |
| DDDD | LB2 | Ph2 |
| ⋮ | ⋮ | ⋮ |

| PATH-GROUP ID | LOGICAL BLOCK | HOST PORT |
|---|---|---|
| EEEE | LB3 | Ph1 |
| ⋮ | ⋮ | ⋮ |

FIG. 5

| PATH-GROUP ID | PORT (in) | PORT (out) |
|---|---|---|
| AAAA | Psw1 | Psw2 |
| BBBB | Psw1 | Psw4 |
| CCCC | Psw3 | Psw4 |
| DDDD | Psw1 | Psw3 |
| EEEE | Psw2 | Psw3 |
| FFFF | Psw2 | Psw4 |
| ⋮ | ⋮ | ⋮ |

FIG. 6

| PATH-GROUP ID | LOGICAL UNIT | STORAGE-DEVICE PORT |
|---|---|---|
| AAAA | LU1 | PI1 |
| DDDD | LU1 | PI1 |

⋮ ⋮ ⋮

| PATH-GROUP ID | LOGICAL UNIT | STORAGE-DEVICE PORT |
|---|---|---|
| BBBB | LU2 | PI1 |
| EEEE | LU2 | PI2 |

⋮ ⋮ ⋮

| PATH-GROUP ID | LOGICAL UNIT | STORAGE-DEVICE PORT |
|---|---|---|
| CCCC | LU3 | PI2 |
| FFFF | LU3 | PI2 |

| PATH-GROUP ID | LOGICAL BLOCK | HOST PORT | PORT(in) | PORT(out) | STORAGE-DEVICE PORT | LOGICAL UNIT |
|---|---|---|---|---|---|---|
| AAAA | LB1 | Ph1 | Psw1 | Psw2 | PI1 | LU1 |
| BBBB | LB2 | Ph3 | Psw1 | Psw4 | PI1 | LU2 |
| CCCC | LB1 | Ph2 | Psw3 | Psw4 | PI2 | LU3 |
| DDDD | LB2 | Ph2 | Psw1 | Psw3 | PI1 | LU1 |
| EEEE | LB3 | Ph1 | Psw2 | Psw3 | PI2 | LU2 |
| FFFF | LB1 | Ph3 | Psw2 | Psw4 | PI2 | LU3 |

METHOD FOR MANAGING COMPUTER SYSTEM, COMPUTER EXECUTING MANAGEMENT PROGRAM, STORAGE DEVICE, DISPLAYING DEVICE, AND STORAGE SYSTEM

CROSS-REFERENCE TO RELATED APPLICATIONS

The present application claims priority upon Japanese Patent Application No. 2001-401706 filed on Dec. 28, 2001, which is herein incorporated by reference.

BACKGROUND OF THE INVENTION

1. Field of the Invention

The present invention relates to a computer-system managing method for managing a state of connections between a host comprising first logical blocks and a storage device comprising second logical blocks. Further, the present invention relates to a computer capable of executing a management program used for the above-mentioned computer system, a storage device, a displaying device, and a storage system.

2. Description of the Related Art

With the rapid increase in the amount of data being handled by information systems, introduction of SANs (Storage Area Networks) is being promoted.

Currently, in system management for a SAN, management of a configuration regarding connections mainly among hardware devices, such as a configuration of connections between a host and a storage device, is being carried out.

A mainframe provides a platform for configuring a large-scale backbone system. In such a mainframe, there are cases in which a plurality of logical blocks operate independently. On the other hand, there are cases in which logical units divided into a plurality of regions operate in a storage device. Thus, it is expected to connect the devices, in which physical resources are shared among a plurality of logical processing units, to a SAN.

On the other hand, in a SAN, it is typical to redundantly configure paths for transferring data between a host and a storage device. In this case, path settings are carried out mainly in accordance with the connecting paths among the hardware devices. Since SANs have been developed mainly on platforms for constructing open systems, in conventional SAN-system management, the configuration of connections among hardware devices is mainly being managed.

Therefore, according to conventional SAN-system management, in cases where a device (such as a mainframe) in which physical resources are shared among a plurality of logical processing units is connected to a SAN, it was not possible for a system administrator to get hold of status on connections among logical processing units, and particularly, to visually grasp the connection status among the logical processing units.

SUMMARY OF THE INVENTION

An object of the present invention is to provide a computer-system managing method in which a system administrator can easily get hold of connection status in a logical configuration.

A main invention accomplishing the above and other objects is a method for managing a computer system in which data can be transferred between a first device and a second device through a plurality of paths. The first device has a plurality of first logical blocks. The second device has a plurality of second logical blocks. The method comprises the steps of: receiving information on the first logical blocks from the first device; receiving information on the second logical blocks from the second device; and generating information showing a connected configuration of the first logical blocks and the second logical blocks based on the information on the first logical blocks received and the information on the second logical blocks received.

Another main invention accomplishing the above and other objects is a computer capable of executing a management program for managing a computer system in which data can be transferred between a first device and a second device through a plurality of paths. The management program makes the computer system in which the first device has a plurality of first logical blocks and the second device has a plurality of second logical blocks to perform the functions of: receiving information on the first logical blocks from the first device; receiving information on the second logical blocks from the second device; and generating information showing a connected configuration of the first logical blocks and the second logical blocks based on the information on the first logical blocks received and the information on the second logical blocks received.

Another main invention accomplishing the above and other objects is a storage device capable of transferring data with a host device having a plurality of host logical blocks. The storage device comprises: a plurality of logical blocks; and a section sending information on the plurality of logical blocks to a management terminal.

Another main invention accomplishing the above and other objects is a display device of a computer system in which data can be transferred between a first device having a plurality of first logical blocks and a second device having a plurality of second logical blocks through a plurality of paths. The display device displays information showing a connected configuration of the first logical blocks and the second logical blocks based on information on the first logical blocks received from the first device and information on the second logical blocks received from the second device.

Another main invention accomplishing the above and other objects is a storage system comprising: a host device having a plurality of first logical blocks; a storage device having a plurality of second logical blocks; a switching device transferring data between the host device and the storage device through a plurality of paths; and a computer receiving information on the first logical blocks from the host device, receiving information on the second logical blocks from the storage device, and generating information showing connecting paths between the first logical blocks and the second logical blocks based on the information on the first logical blocks received and the information on the second logical blocks received.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 5 is an explanatory diagram showing an example of path-group ID information that the hosts 10 comprise;

FIG. 6 is an explanatory diagram showing an example of path-group ID information that the switch comprises;

FIG. 7 is an explanatory diagram showing an example of path-group ID information that the storage devices 30 comprise;

FIG. 8 shows an example of a table regarding the system's connected configuration generated by the management terminal;

DETAILED DESCRIPTION OF THE INVENTION

Figure 1:
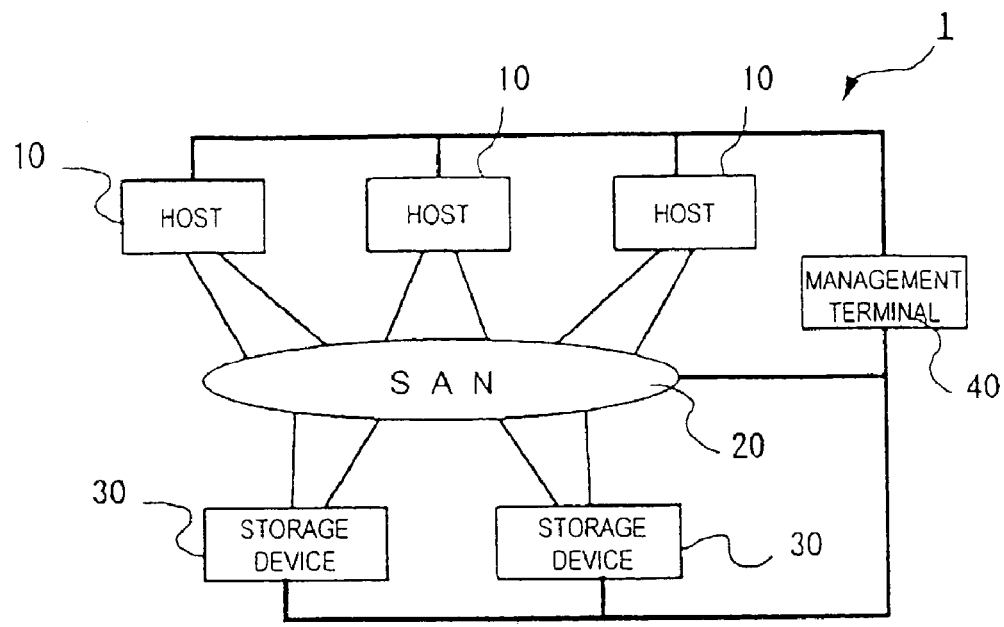
FIG. 1 is a schematic diagram of a computer system according to one aspect of the present invention.

At least the following matters will be made clear by the explanation in the present specification and the description of the accompanying drawings.

An invention is a method for managing a computer system in which data can be transferred between a first device and a second device through a plurality of paths. The first device has a plurality of first logical blocks. The second device has a plurality of second logical blocks. The method comprises the steps of: receiving information on the first logical blocks from the first device; receiving information on the second logical blocks from the second device; and generating information showing a connected configuration of the first logical blocks and the second logical blocks based on the information on the first logical blocks received and the information on the second logical blocks received.

According to the method for managing a computer system, it becomes possible to get hold of the connected configuration between the first logical blocks and the second logical blocks.

The method for managing a computer system may further comprise the step of displaying the information showing the connected configuration of the first logical blocks and the second logical blocks.

According to the method for managing a computer system, it becomes possible for a system administrator to get hold of the connected configuration between the first logical blocks and the second logical blocks.

In the method for managing a computer system, it may be possible for the computer system to comprise a switching device connected between the first device and the second device; the method to further comprise the step of receiving information on connections of the switching device; and the information showing the connected configuration of the first logical blocks and the second logical blocks to be generated based on the information on connections of the switching device received.

According to the method for managing a computer system, it becomes possible to get hold of the paths through which data is transferred between the first logical blocks and the second logical blocks.

Another invention is a computer capable of executing a management program for a computer system in which data can be transferred between a first device and a second device through a plurality of paths. The management program makes the computer system in which the first device has a plurality of first logical blocks and the second device has a plurality of second logical blocks to perform the functions of: receiving information on the first logical blocks from the first device; receiving information on the second logical blocks from the second device; and generating information showing a connected configuration of the first logical blocks and the second logical blocks based on the information on the first logical blocks received and the information on the second logical blocks received.

According to the computer capable of executing such a management program, it becomes possible to control a computer system so that the connected configuration between the first logical blocks and the second logical blocks can be grasped.

In the computer capable of executing a management program, the program may make the computer system to further perform the function of displaying the information showing the connected configuration of the first logical blocks and the second logical blocks.

According to the computer capable of executing such a management program, it becomes possible to control a computer system so that a system administrator can get hold of the connected configuration between the first logical blocks and the second logical blocks.

In the computer capable of executing a management program, the program may make the computer system further comprising a switching device connected between the first device and the second device to further perform the functions of: receiving information on connections of the switching device; and generating the information showing the connected configuration of the first logical blocks and the second logical blocks based on the information on connections of the switching device received.

According to the computer capable of executing such a management program, it becomes possible to control a computer system so that the paths through which data is transferred between the first logical blocks and the second logical blocks can be grasped.

Another invention is a storage device capable of transferring data with a host device having a plurality of host logical blocks. The storage device comprises: a plurality of logical blocks; and a section sending information on the plurality of logical blocks to a management terminal.

According to the storage device, the management terminal can obtain information on the logical blocks of the storage device.

The storage device may further comprise a section storing information for relating together the logical blocks and identifiers for connecting paths between the host logical blocks and the logical blocks.

According to the storage device, it becomes possible to specify the logical blocks based on the identifiers.

Another invention is a display device of a computer system in which data can be transferred between a first device having a plurality of first logical blocks and a second device having a plurality of second logical blocks through a plurality of paths. The display device displays information showing a connected configuration of the first logical blocks and the second logical blocks based on information on the first logical blocks received from the first device and information on the second logical blocks received from the second device.

According to the displaying device, it becomes possible for a system administrator to get hold of the connected configuration between the first logical blocks and the second logical blocks.

In the display device, the second logical blocks that have data-transferring paths with the first logical block designated may be displayed, if one first logical block among the plurality of first logical blocks being displayed is designated.

According to the displaying device, it becomes possible for a system administrator to get hold of the connected configuration between a certain first logical block and the second logical blocks.

In the display device, the first logical blocks that have data-transferring paths with the second logical block designated may be displayed, if one second logical block among the plurality of second logical blocks being displayed is designated.

According to the displaying device, it becomes possible for a system administrator to get hold of the connected configuration between a certain second logical block and the first logical blocks.

Another invention is a storage system comprising: a host device having a plurality of first logical blocks; a storage device having a plurality of second logical blocks; a switching device transferring data between the host device and the storage device through a plurality of paths; and a computer receiving information on the first logical blocks from the host device, receiving information on the second logical blocks from the storage device, and generating information showing connecting paths between the first logical blocks and the second logical blocks based on the information on the first logical blocks received and the information on the second logical blocks received.

Configuration of System

FIG. 1 is a schematic diagram of a computer system according to one aspect of the present invention.

The computer system 1 comprises: hosts 10; a SAN 20; storage devices 30; and a management terminal 40. The computer system 1 manages, with the management terminal 40, a network dedicated to storage input/output where the SAN 20 connects the hosts 10 as a first device and the storage devices 30 as a second device.

The host 10 serves as the first device, and is composed of, for example, a mainframe computer or a personal computer. In the present system, a plurality of hosts 10 are provided. At least one of the hosts 10 comprises a plurality of logical blocks as a mainframe. Note that explanation regarding the logical blocks will be made later. The other hosts may use platforms for constructing an open system. That is, the hosts 10 may be a mixed system of mainframes and open systems.

The SAN 20 is provided between the hosts 10 and the storage devices 30, and transfers data between them through an interface such as Fibre Channel. Further, the SAN 20 configures a plurality of transferring paths (or access routes) between the hosts 10 and the storage devices 30. The SAN 20 comprises at least one switch. Note that explanation regarding the switch will be made later.

The storage device 30 serves as a storing device, which is the second device. The storage device 30 stores transferred data when there is a write-in instruction from the host 10, and transfers stored data when there is a read-out instruction from the host 10. The storage device 30 may be composed of, for example, a storage subsystem such as a disk array device. In the present system, a plurality of storage devices 30 may be provided. Further a tape library, for example, may be provided as other storing devices. The storage device 30 comprises a plurality of logical units (or, second logical blocks) which are formed using a plurality of storage regions. Note that explanation regarding the logical units will be made later.

The management terminal 40 manages a state of connections between the logical blocks of the hosts 10 and the logical units of the storage devices 30, and is composed of, for example, a mainframe computer or a personal computer. The management terminal 40 is connected to the hosts 10, the SAN 20, and the storage devices 30 through, for example, a LAN. Accordingly, the management terminal 40 can: receive information on the logical blocks from the hosts 10; receive information on the connections of the switches from the SAN 20; and receive information on the logical units from the storage devices 30. Explanation regarding receiving the above information will be made later. Note that the management terminal 40 may be, for example, other client terminals connected through the LAN. Based on the information received, the management terminal 40 generates information showing the state of connections between the logical blocks of the hosts 10 and the logical units of the storage devices 30, and displays a result of the connected configuration on a displaying device, but the detail will be described later. Note that a program for executing the above-mentioned functions is installed in the management terminal 40.

Configuration of Host

Figure 2:
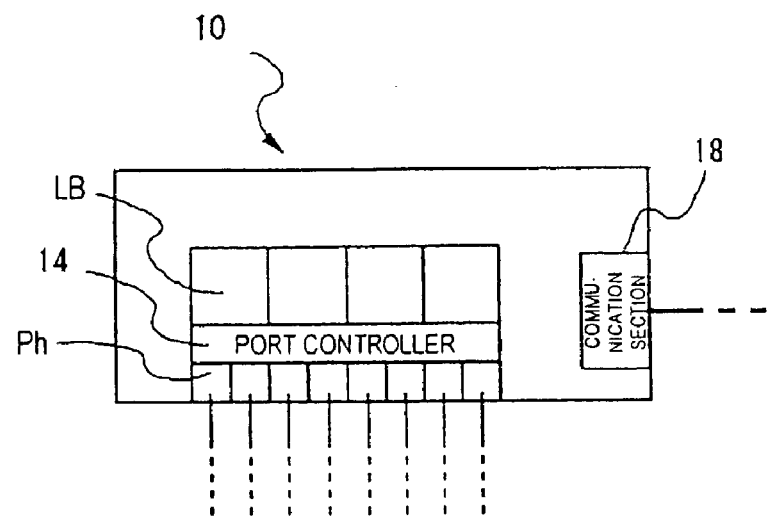
FIG. 2 is an explanatory diagram of the host shown in FIG. 1.

FIG. 2 is a schematic diagram of a host used in the computer system according to one aspect of the present invention.

The host 10 shown in FIG. 2 comprises: a plurality of logical blocks LB; a port controller 14; a plurality of ports Ph; and a communication section 18.

The logical block LB is a logical processing unit. The logical blocks LB share physical resources such as CPUs and memories. A state in which a plurality of operating systems are operating in a mainframe may be considered as an example of a state in which a plurality of logical blocks LB are operating in the host 10.

The port controller 14 is for controlling the ports Ph.

A plurality of ports Ph are provided in the host 10 and are shared among the above-mentioned plurality of logical blocks LB. In the case where the ports Ph are shared among the logical blocks LB, even if a path is designated based on a port, which is hardware, like conventional cases, it does not mean that the logical block LB is also be specified along therewith. Thus, in the present embodiment, using a path-group ID which will be explained later, identification of a connecting path of logical blocks, which are logical processing units, is to be made.

The communication section 18 is for sending information which relates to, for example, the logical blocks which is stored in a memory (not shown) of the host 10 to the management terminal 40. It is, for example, the LAN, which connects the management terminal 40 and the communication section 18, through which the information is sent to the management terminal 40.

FIG. 5 is an explanatory diagram showing an example of information stored in the memory of each host 10.

In FIG. 5, the information stored in the memory of each host 10 relates together the path-group IDs, the logical blocks, and the host ports. In the figure, the path-group IDs (for example, AAAA through FFFF) are identifiers by which the logical blocks and the host ports are related. The logical-block information indicates the respective logical blocks LB1 through LB3 of the host 10. The port information indicates the numbers (Ph1 through Phn) of the respective ports provided in the host 10. Accordingly, if a path-group ID is specified, the logical block LB and the host port Ph will be uniquely determined along therewith.

The above-mentioned information stored in the memory of the respective hosts 10 is sent to the management terminal 40 through the LAN by a communication interface of each host 10. Note that, as information for making a match with the logical blocks other than the above-mentioned logical-block information etc., the host 10 may send, for example, the following information to the management terminal 40: information on a serial number of the host 10; information on channel paths; information on connections of the channel paths and logical paths; information on definitions of the storage device; and/or port numbers.

Configuration of Switch

Figure 3:
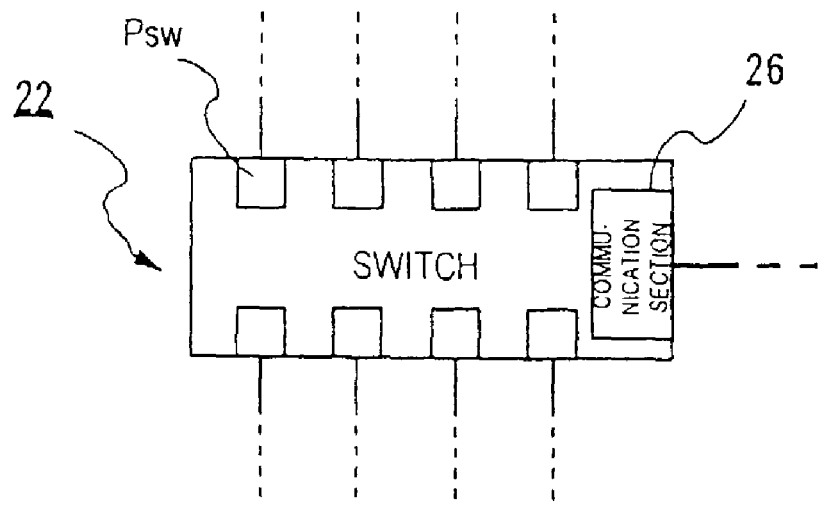
FIG. 3 is an explanatory diagram of a switch used in the SAN shown in FIG. 1.

FIG. 3 is a schematic diagram of a switch used in the computer system according to one aspect of the present invention.

The switch 22 in FIG. 3 has a function as a switching device. The switch 22 is connected between the hosts 10 and the storage devices 30, and is used to configure the SAN shown in FIG. 1. switch 22 comprises a plurality of ports 24 and a communication section 26.

The communication section 26 is for sending port information stored in a memory (not shown) of the switch 22 to the management terminal 40. It is, for example, the LAN, which connects the management terminal 40 and the communication section 26, through which the information is sent to the management terminal 40.

FIG. 6 is an explanatory diagram showing an example of the information stored in the memory of the switch 22.

In FIG. 6, the information that the switch 22 stores in its memory relates together the path-group IDs, input ports, and output ports. In the figure, the path-group IDs (for example, AAAA through FFFF) are identifiers by which the input ports and the output ports are related. The input-port information indicates the number of a port to which signals are input among the ports (Psw1 through Pswn) provided in the switch 22. The output-port information indicates the number of a port from which signals are output among the ports (Psw1 through Pswn) provided in the switch 22. Accordingly, if a path-group ID is specified, the input port and the output port will be uniquely determined along therewith.

When the switch receives a packet, it specifies a port through which the packet is to be passed based on the path-group ID that the packet header contains, and sends the packet out from the specified port. Concerning packet transferring by the switch 22, the switch 22 may either determine a port just by reading only the path-group ID in the header (or only the header) and transfer a packet through that port, or the switch 22 may first receive the whole packet in its buffer, regenerate a signal, and then transfer the packet from the determined port.

The above-mentioned information stored in each of the switches 22 provided in the SAN is sent by a communication interface of each switch 22 to the management terminal 40 through the LAN. Note that, as information for making a match with the ports other than the above-mentioned port information etc., the switch 22 may send, for example, the following information to the management terminal 40: serial-number information on the switch 22; zone-defining information; and/or operational information on each of the switches/ports.

Configuration of Storage Device

Figure 4:
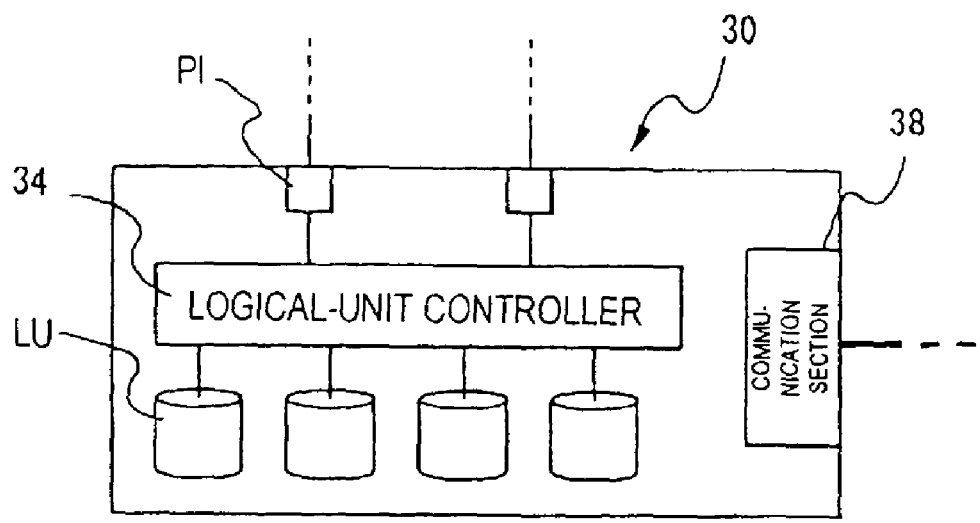
FIG. 4 is an explanatory diagram of the storage device shown in FIG. 1.

FIG. 4 is a schematic diagram of a storage device used in the computer system according to one aspect of the present invention.

In FIG. 4, the storage device 30 comprises: a plurality of logical units LU; a logical-unit controller 34; a plurality of ports Pl; and a communication section 38.

The logical unit LU is a logical processing unit. The logical units LU share physical resources such as storage media and CPUs.

The logical-unit controller 34 is for controlling the logical units LU.

A plurality of ports Pl are provided in the storage device 30, and are shared among the above-mentioned plurality of logical units LU. In the case where the ports Pl are shared among the logical units LU, even if a path is designated based on a port, which is hardware, like conventional cases, it does not mean that the logical unit LU is also be specified along therewith. Thus, in the present embodiment, using a path-group ID which is to be explained later, identification of a connecting path of logical units LU, which are logical processing units, is to be made.

The communication section 38 is for sending information on, for example, the logical units which is stored in a memory (not shown) of the storage device 30 to the management terminal 40. It is, for example, the LAN, which connects the management terminal 40 and the communication section 38, through which the information is sent to the management terminal 40.

FIG. 7 is an explanatory diagram showing an example of information stored in the memory of each storage device 30.

In FIG. 7, the information stored in the memory of each of the storage devices 30 relates together the path-group IDs, the storage-device ports, and the logical units. In the figure, the path-group IDs (for example, AAAA through FFFF) are identifiers by which the logical units and the storage-device ports are related. The logical-unit information indicates the numbers (LU1 through LUn) of the respective logical units in the storage device 30. The storage-device port information indicates a port number among the numbers (Pl1 through Pln) for the ports provided in the storage device 30 and through which signals are to be input (or output). Accordingly, if a path-group ID is specified, the logical unit and the storage-device port will be uniquely determined along therewith.

The above-mentioned information stored in the memory of each storage device 30 is sent to the management terminal 40 through the LAN by a communication interface of each storage device 30. Note that, as information for making a match with the logical units other than the above-mentioned logical-unit information etc., the storage device 30 may send, for example, the following information to the management terminal 40: information on the respective logical units LU and their addresses; information on the configuration of the ports; information on the configuration of physical devices; operational information on each of the channels and/or the physical devices; a serial number; a volume address; and/or a port number.

When the storage device 30 receives a packet, the storage device 30 specifies a logical unit LU to which the packet is to be sent based on the path-group ID that the packet header contains, and sends the packet out to the specified logical unit LU. Upon packet transferring by the storage device 30, the storage device 30 may either determine a logical unit just by reading only the path-group ID in the header (or only the header) and transfer a packet through that port, or the storage device 30 may first receive the whole packet in its buffer, regenerate a signal, and then determine the logical unit.

In the present embodiment, the path-group IDs are incorporated in the headers of the respective packets. However, the configuration is not limited to the above. For example, if the packet contains information on the source port address and the designation port address and the respective devices are provided with information on a relationship between a combination of the source/destination port addresses and a path-group ID, the respective devices will be able to determine the path-group ID. That is, if the packet contains information necessary for determining a path-group ID, it will be possible to specify the path-group ID.

Generating Data of Connection State

The management terminal 40: receives information on the logical blocks etc. (see FIG. 5) from the hosts 10; receives the port information etc. (see FIG. 6) from the switch 22 of the SAN 20; and receives information on the logical units etc. (see FIG. 7) from the storage devices 30. The management terminal 40 will be able to generate information showing a connected configuration between the logical blocks LB and the logical units LU based on the information received.

FIG. 8 shows an example of information showing the connected configuration between the logical blocks LB and the logical units LU generated by the management terminal 40 based on the information received.

FIG. 8 shows an example of the data generated based on the path-group IDs by gathering the information shown in FIG. 5 through FIG. 7 received by the management terminal 40. As a result of gathering the information shown in FIG. 5 through FIG. 7 based on the path-group IDs, the path-group ID functions as an identifier for indicating a path from a logical block LB to a logical unit LU, as shown in FIG. 8. Further, since the path-group ID will uniquely specify a path from a logical block LB to a logical unit LU, it will function as a unique identifier for each path.

Conventionally, for example, each of the hosts connected to the SAN managed the connected configuration of its own. Therefore, conventionally, it took time and efforts for a system administrator to confirm the connected configuration between the logical blocks and the logical units. However, according to the present embodiment, it becomes easy for the system administrator to manage the connected configuration of the whole system, and thus, it becomes convenient upon constructing a system in which the system administrator can efficiently use resources.

Further, even if one of the hosts 10 (see FIG. 1) is an open system, it is possible to similarly specify the connecting paths between the logical blocks and the logical units, which are logical processing units, using the path-group IDs. On the contrary, by introducing the method of specifying a connecting path between a logical block and a logical unit using a path-group ID, as shown in FIG. 8, to a conventional system, it will become easy to configure a SAN to be a mixed system in which both mainframes and open systems reside.

Explanation of Display

In a computer system including a mainframe, it will be convenient if it would be possible to show information showing the connected configuration between the logical blocks LB and the logical units LU to a system administrator.

In the present embodiment, a displaying device, such as a display, provided in the management terminal shows the data shown in FIG. 8 on the connected configuration between the logical blocks LB and the logical units LU.

Further, there may be cases where it would be difficult for the system administrator to get hold of the connected configuration of the system only by viewing a table as shown in FIG. 8 regarding the connected configuration of the system.

Figure 9:
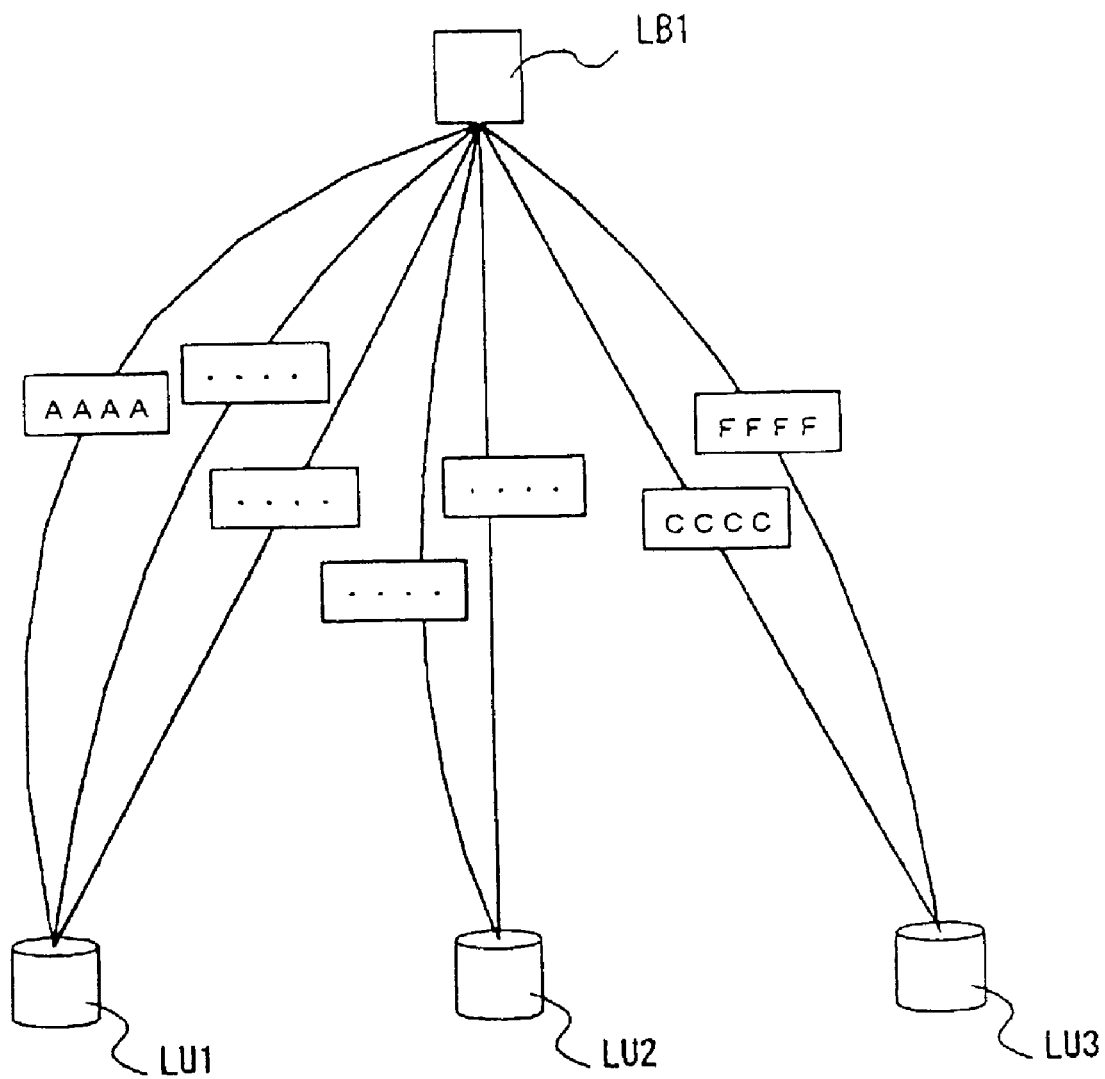
FIG. 9 shows an example of a display screen showing the connected configuration from the viewpoint of the logical block LB1.

FIG. 9 shows an example of displaying the connected configuration of the system. The connected configuration shown in FIG. 9 will be shown if, for example, the system administrator designates "LB1" of the "LOGICAL BLOCK" when the table of FIG. 8 is being shown on the display. FIG. 9 visually indicates logical units LU to which the logical block LB1 is connected, and paths for transferring data to the logical units LU.

When the system administrator designates "LB1" of the "LOGICAL BLOCK", the management terminal 40 searches for path-group IDs in which the "LOGICAL BLOCK" is "LB1" based on the data of FIG. 8 that has already been generated. Assume that "AAAA", "CCCC", "FFFF", and other certain path-group IDs meet the condition as a result of the search. Next, the management terminal 40 searches for the logical units LU that are connected to the logical block LB1 based on the path-group IDs retrieved. Then, on the display, the management terminal 40 shows the logical block LB1, the logical units LU that are connected to the logical block LB1, and the associated path-group IDs.

Figure 10:
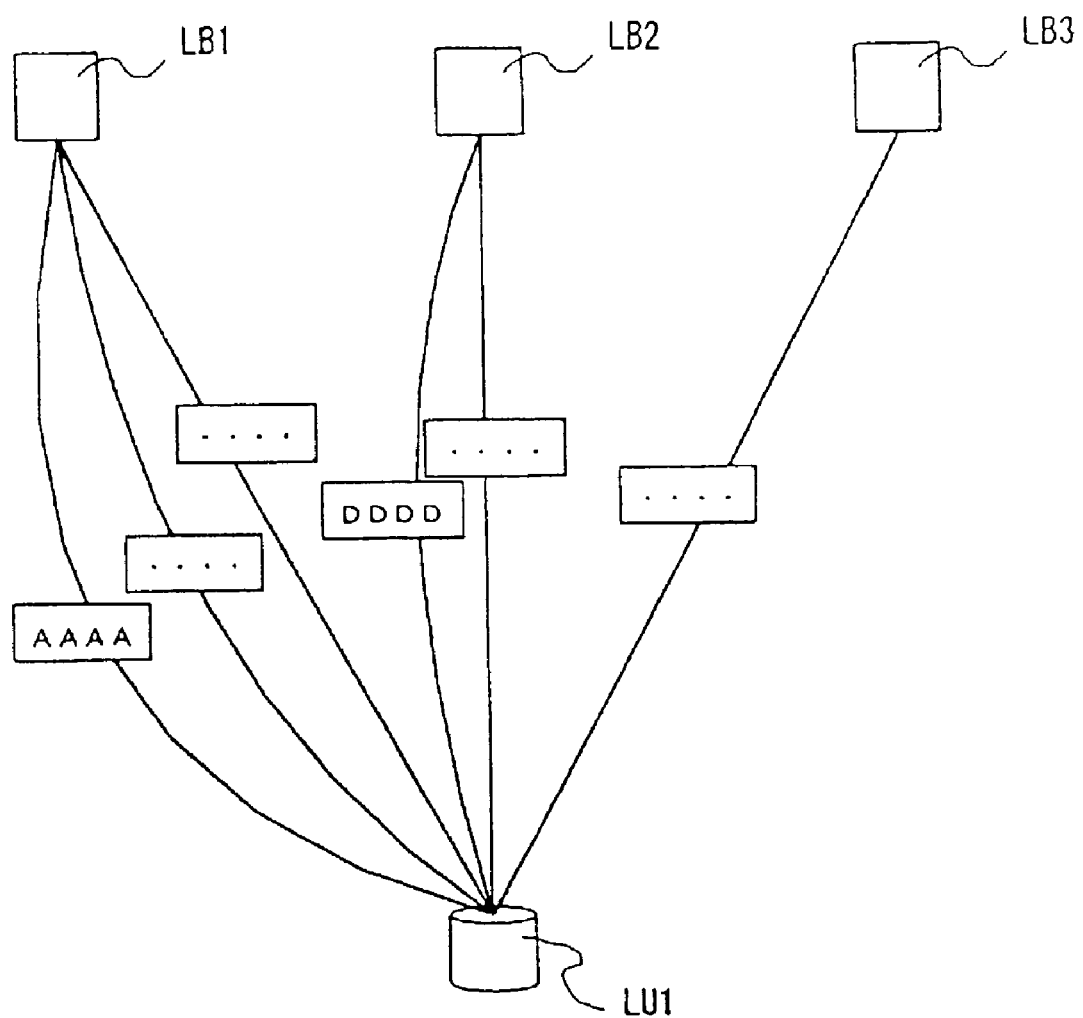
FIG. 10 shows an example of a display -screen showing the connected configuration from the viewpoint of the logical unit LU1.

Further, FIG. 10 shows an example of displaying the connected configuration of the system. The connected configuration shown in FIG. 10 will be shown on the display if, for example: (1) the system administrator designates "LU1" of the "LOGICAL UNIT" when the table of FIG. 8 is being shown on the display, or (2) the system administrator designates "LU1" when the display of FIG. 9 is being shown on the display. FIG. 10 visually indicates logical blocks to which the logical unit LU1 is connected, and paths for transferring data to the logical blocks.

When the system administrator designates "LU1" of the "LOGICAL UNIT" in the screens shown in FIG. 8 or FIG. 9, the management terminal 40 searches for path-group IDs in which the "LOGICAL UNIT" is "LU1" based on the data of FIG. 8 that has already been generated. Assume that "AAAA", "DDDD", and other certain path-group IDs meet the condition as a result of the search. Next, the management terminal 40 searches for the logical blocks that are connected to the logical unit LU1 based on the path-group IDs retrieved. Then, on the display, the management terminal 40 shows the logical unit LU1, the logical blocks LB that are connected to the logical unit LU1, and the associated path-group IDs.

It is to be noted that displaying of the connected configuration of the system is not to be limited to those shown in FIG. 8 through FIG. 10. For example, it is possible to delete, add, or change any item in FIG. 8. Further, in FIG. 9 and FIG. 10, it is possible to show ports and/or switches instead of the path-group IDs. Further, in FIG. 9 and FIG. 10, displaying may be made in a tree structure in which expanding/contracting operations by clicking on a node, or branch point, are made possible. In short, it is important that the connected configuration of the logical processing units is displayed in a manner that can be easily appreciated by the system administrator.

Further, it is not limited to the display focusing on the logical block in FIG. 8 and that focusing on the logical unit in FIG. 9. For example, there may be shown a display focusing on the port or switches 22.

Further, it may display information on operational status such as traffic in each transferring path, along with displaying of the connected configuration of the system. Accordingly, with reference to the traffic regarding the current connected configuration, the system administrator will be able to configure a system in which its resources can more efficiently be used. Note that such information on the operational status may be shown for each of the transferring paths. Further, the information may be shown in real time. It is particularly preferred for the information on the operational status to be shown in real time in case there is a change in the connected configuration due to some failure.

The displaying device such as the display comprises the above-mentioned functions since the management terminal 40 is controlled by a program installed in the management terminal to which the displaying device is connected. However, the program may be installed in the host 10, and a displaying device connected to the host 10 may comprise the above-mentioned functions.

Further, this program may be recorded on a storage medium that the management terminal 40 is capable of reading.

As apparent from the above explanation, according to the present embodiment, it becomes possible to get hold of the connected configuration between first logical blocks and second logical blocks.

Although the preferred embodiment of the present invention has been described in detail, it should be understood that various changes, substitutions and alterations can be made therein without departing from spirit and scope of the inventions as defined by the appended claims.

What is claimed is:

1. A method for managing a computer system in which data can be transferred between a plurality of host computers and a plurality of storage devices through a plurality of paths through a storage area network comprising a plurality of switches that connect the host computers with the storage devices,
    said host computers having a plurality of first logical blocks,
    said storage devices having a plurality of second logical blocks,
    said method comprising the steps of:
    receiving information on said first logical blocks at a management terminal from said host computers, the received first logical block information including logical block information related to operating systems of the host computers, upper port information related to a port for transmitting data from the operating system, and a path group ID that relates the first logical block information to the upper port information of the host computers;
    receiving information on said second logical blocks at the management terminal from said storage devices, the received second logical block information including the oath group ID, logical unit information related to logical units of the storage devices, and lower port information related to a port for receiving data to be stored in the logical units;
    receiving switch information at the management terminal from said switches, the switch information including the path group ID, receiving port information indicating ports for receiving data, and transmitting port information indicating ports for transmitting data;
    generating a table that stores information related to paths from the operating systems to the logical units according to the path group ID and relating the logical block information, the upper port information, the lower port information, the receiving port information, the transmitting port information, and the logical unit information and
    displaying configuration information for data transfer paths between one or more logical blocks and one or more logical units in response to designation information received at the management terminal, in accordance with information in the generated table.

2. A method according to claim 1, wherein displaying comprises:
    displaying all paths from a specified logical block to logical units in response to the logical block specified at the management terminal, in accordance with information in the generated table, and displaying all paths from a specified logical unit to logical blocks in response to the logical unit specified at the management terminal, in accordance with information in the generated table.

3. A computer for executing a management program for managing a computer system in which data can be transferred between a plurality of host computers and a plurality of storage devices through a storage area network comprising a plurality of switches that connect the host computers with the storage devices, wherein
    said management program makes said computer system, in which said host computers have a plurality of first logical blocks and said storage devices have a plurality of second logical blocks, to perform the functions of:
    receiving information on said first logical blocks at a management terminal from said host computers, the received first logical block information including logical block information related to operating systems of the host computers, upper port information related to a port for transmitting data from the operating system, and a path group ID that relates the first logical block information to the upper port information of the host computers;
    receiving information on said second logical blocks from said storage devices, the received second logical block information including the path group ID, logical unit information related to logical units of the storage devices, and lower port information related to a port for receiving data to be stored in the logical units;
    receiving switch information at the management terminal from said switches, the switch information including the path group ID, receiving port information indicating ports for receiving data, and transmitting port information indicating ports for transmitting data;
    generating a table that stores information related to paths from the operating systems to the logical units according to the path group ID and relating the logical block information, the upper port information, the lower port information, the receiving port information, the transmitting port information, and the logical unit information; and
    displaying configuration information for data transfer paths between one or more logical blocks and one or more logical units in response to designation information received at the management terminal, in accordance with information in the generated table.

4. A computer according to claim 3, wherein said management program further makes the computer system perform the function of:

displaying all paths from a specified logical block to logical units in response to the logical block specified at the management terminal, in accordance with information in the generated table, and displaying all paths from a specified logical unit to logical blocks in response to the logical unit specified at the management terminal, in accordance with information in the generated table.

5. A display device of a computer system in which data can be transferred between a plurality of host computers having a plurality of first logical blocks and a plurality of storage devices having a plurality of second logical blocks through a plurality of paths through a storage area network comprising a plurality of switches that connect the host computers with the storage devices, wherein said display device comprises a management terminal that displays information showing a connected configuration of said first logical blocks and said second logical blocks based on information on said first logical blocks received from said host computers and information on said second logical blocks received from said storage devices, the received first logical block information including logical block information related to operating systems of the host computers, upper port information related to a port for transmitting data from the operating system, and a oath group ID that relates the first logical block information to the upper port information of the host computers, the received second logical block information including the path group ID, logical unit information related to logical units of the storage devices, and lower port information related to a port for receiving data to he stored in the logical units, the management terminal receiving switch information from said switches, the switch information including the path group ID, receiving port information indicating ports for receiving data, and transmitting port information indicating ports for transmitting data, the management terminal generating a table that stores information related to paths from the operating systems to the logical units according to the path group ID and relating the logical block information, the upper port information, the lower port information, the receiving port information, the transmitting port information, and the logical unit information; and the management terminal displaying configuration information for data transfer paths between one or more logical blocks and one or more logical units in response to designation information received at the management terminal, in accordance with information in the generated table.

6. A display device according to claim 5 wherein, if one first logical block among said plurality of first logical blocks being displayed is designated, said second logical blocks that have data-transferring paths with said first logical block designated are displayed.

7. A display device according to claim 5, wherein, if one second logical block among said plurality of second logical blocks being displayed is designated, said first logical blocks that have data-transferring paths with said second logical block designated are displayed.

8. A display device according to claim 5, wherein said management terminal displays all paths from a specified logical block to logical units in response to the logical block specified at the management terminal, in accordance with information in the generated table, and displays all paths from a specified logical unit to logical blocks in response to the logical unit specified at the management terminal, in accordance with information in the generated table.

9. A storage system comprising:
a plurality of host computers, having a plurality of first logical blocks;
a plurality of storage devices, having a plurality of second logical blocks;
a plurality of switches comprising a storage area network transferring data between said host computers and said storage devices through a plurality of paths; and
a management terminal computer receiving information on said first logical blocks from said host computers, the received first logical block information including logical block information related to operating systems of the host computers, upper port information related to a port for transmitting data from the operating system, and a path group ID that relates the first logical block information to the upper port information of the host computers, the management terminal computer receiving information on said second logical blocks from said storage devices, the received second logical block information including the path group ID, logical unit information related to logical units of the storage devices, and lower port information related to a port for receiving data to be stored in the logical units,
the management terminal computer further receiving switch information from said switches, the switch information including the path group ID, receiving port information indicating ports for receiving data, and transmitting port information indicating ports for transmitting data,
the management terminal computer generating a table that stores information related to aths from the operatings systems to the logical units accordin to the path group ID and relating the logical block information, the upper port information, the lower port information, the receiving port information, the transmitting port information, and the logical unit information; and
the management terminal computer generating information showing connecting paths between said first logical blocks and said second logical blocks based on said information on said first logical blocks received and said information on said second logical blocks received and displaying configuration information for data transfer paths between one or more logical blocks and one or more logical units in response to designation information received at the management terminal, in accordance with information in the generated table.

10. A storage system according to claim 9, wherein the management terminal computer of the storage system displays all paths from a specified logical block to logical units in response to the logical block specified at the management terminal, in accordance with information in the generated table, and displays all paths from a specified logical unit to logical blocks in response to the logical unit specified at the management terminal, in accordance with information in the generated table.

* * * * *